United States Patent [19]

Yoshida

[11] Patent Number: 5,257,400
[45] Date of Patent: Oct. 26, 1993

[54] CELLULAR MOBILE TELEPHONE SYSTEM
[75] Inventor: Ikio Yoshida, Tokyo, Japan
[73] Assignee: NEC Corporation, Japan
[21] Appl. No.: 647,792
[22] Filed: Jan. 30, 1991
[30] Foreign Application Priority Data Jan. 30, 1990 [JP] Japan .................................. 2-20328

[51] Int. Cl.5 .......................... H04Q 7/02; H04Q 9/02; H04B 7/00
[52] U.S. Cl. .................................. 455/33.1; 455/34.1; 455/54.2; 455/161.2; 379/63
[58] Field of Search ................. 455/33.1, 33.2, 33.3, 455/33.4, 34.1, 34.2, 54.1, 54.2, 56.1, 62, 161.2, 166.2; 379/58, 59, 60, 63

[56] References Cited

U.S. PATENT DOCUMENTS

| | | | |
|---|---|---|---|
| 4,742,560 | 3/1988 | Arai | 455/56.1 |
| 4,750,198 | 6/1988 | Harper | 379/59 |
| 4,775,999 | 10/1988 | Williams | 379/59 |
| 4,876,738 | 10/1989 | Selby | 379/59 |
| 4,903,320 | 2/1990 | Hanawa | |
| 4,905,301 | 2/1990 | Krolopp | |
| 5,093,926 | 3/1992 | Sasuta | 455/62 |
| 5,101,500 | 3/1992 | Marui | 455/56.1 |

FOREIGN PATENT DOCUMENTS

| | | |
|---|---|---|
| 0260763 | 3/1988 | European Pat. Off. |
| 0283955 | 9/1988 | European Pat. Off. |
| 0352786 | 1/1990 | European Pat. Off. |
| 8808238 | 10/1988 | World Int. Prop. O. |

Primary Examiner—Reinhard J. Eisenzopf
Assistant Examiner—Lisa Charouel
Attorney, Agent, or Firm—Ostrolenk, Faber, Gerb & Soffen

[57] ABSTRACT

In a cellular mobile telephone system serving a plurality of cells, each of the cells being assigned a unique standby channel, the mobile station is assigned several standby channels and a system identifier identifying the system. The standby channels are scanned and one of the scanned channels having a highest signal level is selected. If there is a match between the system identifier of the selected standby channel and the system identifier of the mobile station, the mobile station is ready to originate or receive a call. If there is no originating or incoming call, the identifier of a call setup channel specified by the standby channel is stored into a different location of a memory. Otherwise, the identifiers stored in the memory are scanned, and one of the scanned call setup channels is selected.

8 Claims, 5 Drawing Sheets

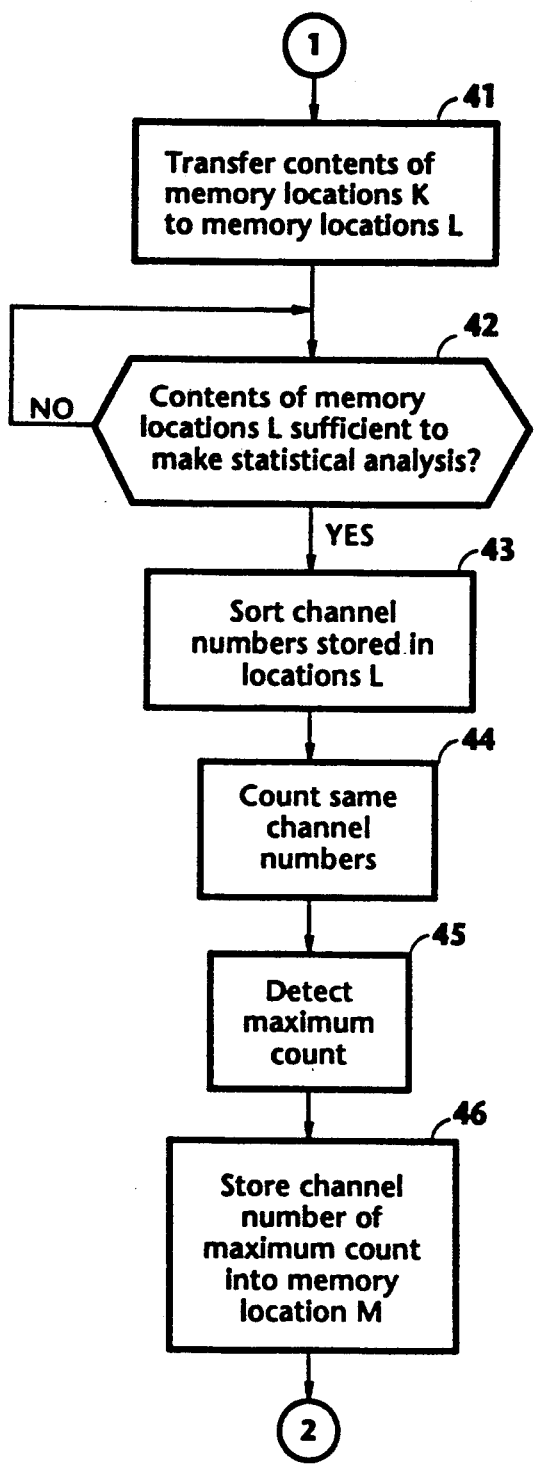

CELLULAR MOBILE TELEPHONE SYSTEM

BACKGROUND OF THE INVENTION

The present invention relates generally to cellular mobile telephone systems, and more specifically to a channel selection technique for selecting a control channel during call setup periods.

According to the EIA or TACS cellular mobile telephone system, idle mobile stations are normally tuned to an assigned standby channel to receive identifiers of call setup channels specified by the standby channel. When originating or receiving a call, the mobile station detects the signal levels of the specified call setup channels and selects one having the highest signal level and transmits a call-request signal or returns an answer signal over the selected channel.

Recent demands for mobile telephone systems have given rise to the establishment of similar mobile telephone systems by different common carriers, using a frequency reuse scheme. However, in some fringe areas, an undesirable situation can occur in which a certain frequency band is shared between adjacent cells served by different common carriers. The mobile station is constantly receiving call setup channel identifiers specified by the strongest standby channel of its own system. If the up-direction call setup channel that is paired with the strongest down-direction call setup channel is shared with the subscribers of a different common carrier in an adjacent cell, the signal levels of the different common carrier may, in some cases, be stronger than those of its own signal. If a call is attempted under such circumstances, it is likely that the mobile station will seize a call setup channel of the different common carrier.

SUMMARY OF THE INVENTION

It is therefore an object of the present invention to reduce the likelihood of a mobile station selecting undesired control channels.

According to the present invention, thre is provided a method for selecting channels of a mobile station for a cellular mobile telephone system serving a plurality of cells. Each of the cells is assigned a unique standby, or paging channel, and the mobile station is assigned a plurality of standby channels and a system identifier. During idle states, the assigned standby channels are constantly scanned by the mobile station and one of the scanned standby channels having a highest signal level is selected. If there is a match between the system identifier of the selected standby channel and that of the mobile station, the mobile station is ready to originate or receive a call. If there is no originating or incoming call, the channel number of a call setup channel specified by the standby channel is stored into a successive location of a memory. If there is an originating or incoming call, the channel numbers stored in the memory are scanned, and one of the scanned call setup channels is selected for returning an answer signal or a call request signal.

BRIEF DESCRIPTION OF THE DRAWINGS

The present invention will be described in further detail with reference to the accompanying drawings, in which:

FIGS. 4A and 4B are flowcharts describing the controller instructions according to a further modification of this invention.

DETAILED DESCRIPTION

Figure 1:
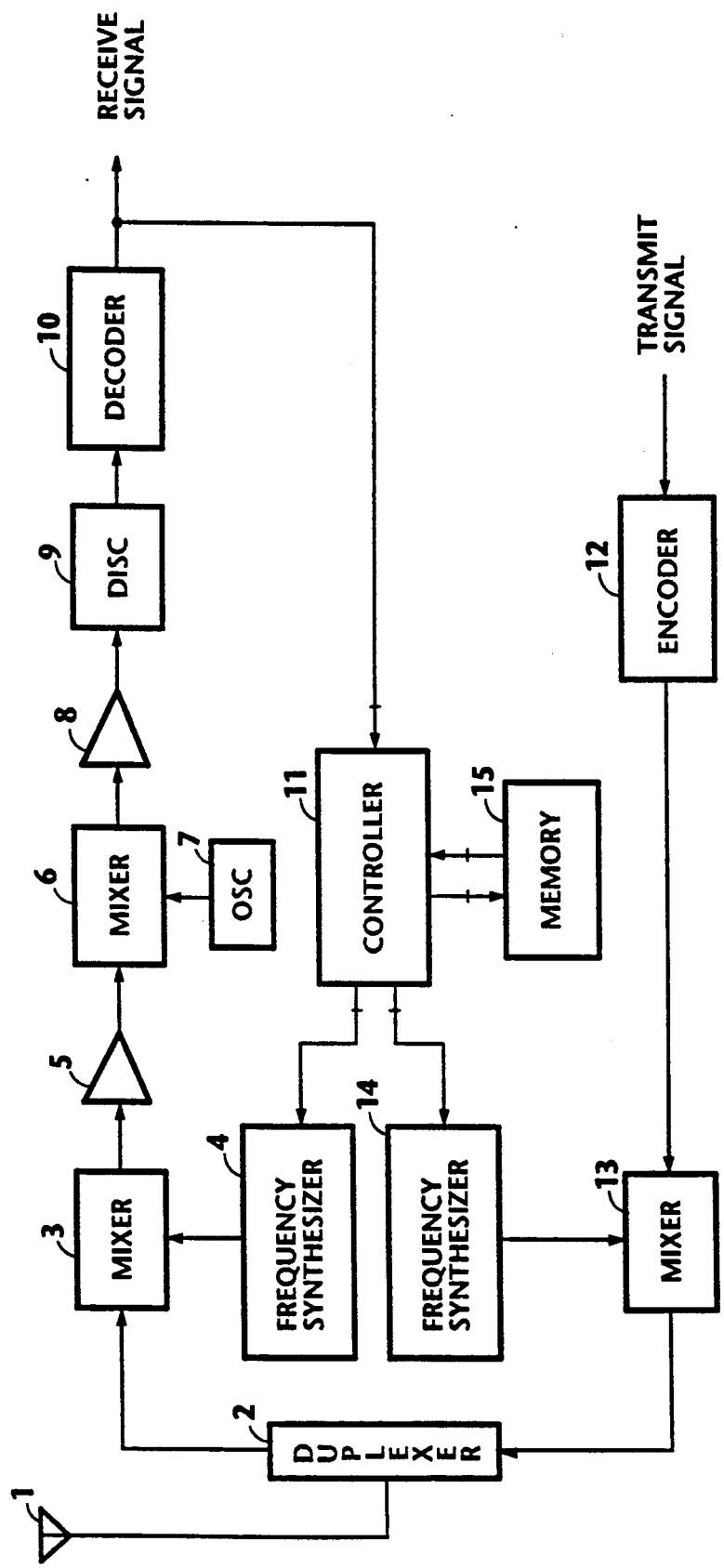
FIG. 1 is a block diagram of a cellular mobile unit according to the present invention.

Referring now to FIG. 1, there is shown a mobile telephone station embodying the present invention for a cellular mobile telephone system covering a plurality of service zones, or cells, each being assigned a unique standby control channel. The standby channel is a down-direction (from the base station to mobile stations) channel and contains information specifying a number of two-way call setup channels. These control channels occupy a band of frequencies adjacent to a band of speech channels within the allocated frequency spectrum. The mobile station is assigned a plurality of different standby channels.

RF signal from a cell site is received by an antenna 1 and passed through a duplexer 2 to a mixer 3 where it is converted to a first intermediate frequency with a local carrier generated by a frequency synthesizer 4. After passing through an amplifier 5, the mixer 3 output is converted to a second intermediate frequency by a mixer 6 using a local carrier from an oscillator 7. The output of mixer 6 is passed through an amplifier 8 and applied to a discriminator 9 in which the original digital signal is recovered. A decoder 10 is coupled to discriminator 9 to supply decoded signals to a channel controller 11.

On the other hand, coded transmit signal is supplied from an encoder 12 to a mixer 13 in which it is converted to radio frequency with a local carrier supplied from a frequency synthesizer 14 for transmission to a cell site. Frequency synthesizers 4 and 14 are controlled by channel controller 11. A memory 15 is connected to controller 15 to store channel selection data in a manner as will be described below.

Figure 2:
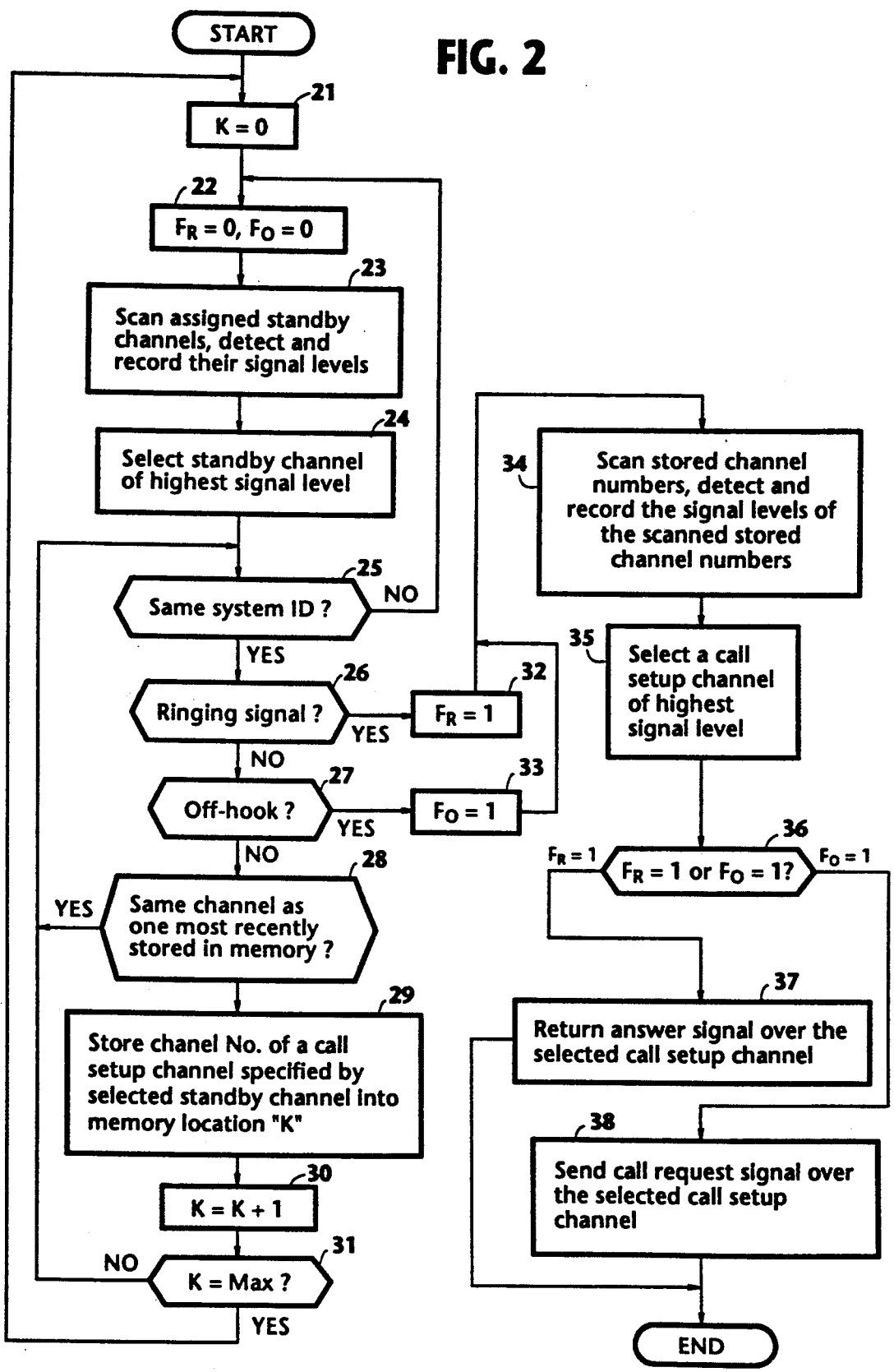
FIG. 2 is a flowchart describing the instructions performed by the controller of FIG. 1 according to an embodiment of this invention.

Channel controller 11 is programmed to perform instructions described in FIGS. 2, 3, 4A and 4B. In FIG. 2, the program execution starts with an initialization step 21 in which a variable K is reset to zero. Exit then is to second initialization step 22 in which flags $F_R$ and $F_O$ are reset to zero. Exit then is to operations step 23 which directs the scanning of standby channels assigned to the mobile station by sweeping the frequency of the local carrier of receive frequency synthesizer 4. The signal level of each scanned channel is detected and recorded. Control exits to step 24 to select one of the scanned standby channels having the highest signal level. Exit then is to decision step 25 which checks to see if there is a match between the system identifier of the selected standby channel and that of the mobile station. If the answer is negative, control returns to step 22, and if it is affirmative, exit is to decision step 26 to check to see if a ringing signal is received. If the answer is negative, control moves to decision step 27 to check to see if there is an off-hook condition. If there is none, control proceeds to decision step 28 to determine if there is a match between the call-setup channel's channel number specified by the selected standby channel and a most recently stored channel number in memory 15. If a match is detected, control returns to step 25 to repeat the process. If a mismatch is detected, control advances to operations step 29 to store the channel number of a call setup channel specified by the selected standby channel into a location K of memory 15. Variable K is incremented by 1 (step 30) and checked against a maximum value representing the capacity of memory 15 (step 31). If the answer is negative, control returns to step 25, and if affirmative, it returns to step 21 to reset the variable K to zero again. As control loops through steps 22 to 31 while driving the vehicle, the channel numbers of call-set-up channels specified by multiple standby channels will be stored in several locations of memory 15.

If a call is received from the base station, the answer in step 26 becomes affirmative and flag $F_R$ is set equal to 1 (step 32) or a call is originated from the mobile station, the answer in step 27 becomes affirmative and flag $F_O$ is set equal to 1 (step 33). Control exits to operations step 34 to scan all channel numbers stored in memory 15 by sweeping the frequency of the synthesizer 4 to tune the mobile receiver successively to the call setup channels having their channel numbers stored in the memory. The signal levels of these call setup channels are detected and recorded. Exit then is to step 35 to select one of the call setup channels having the highest signal level.

Exit then is to step 36 to check to see which of flag $F_R$ or $F_O$ is set equal to 1. If $F_R=1$, step 37 is executed by returning an answer signal over the selected call setup channel to establish a ringing connection, and if $F_O=1$, step 38 is executed by sending a call request signal over the selected call setup channel to establish a dialing connection.

Figure 3:
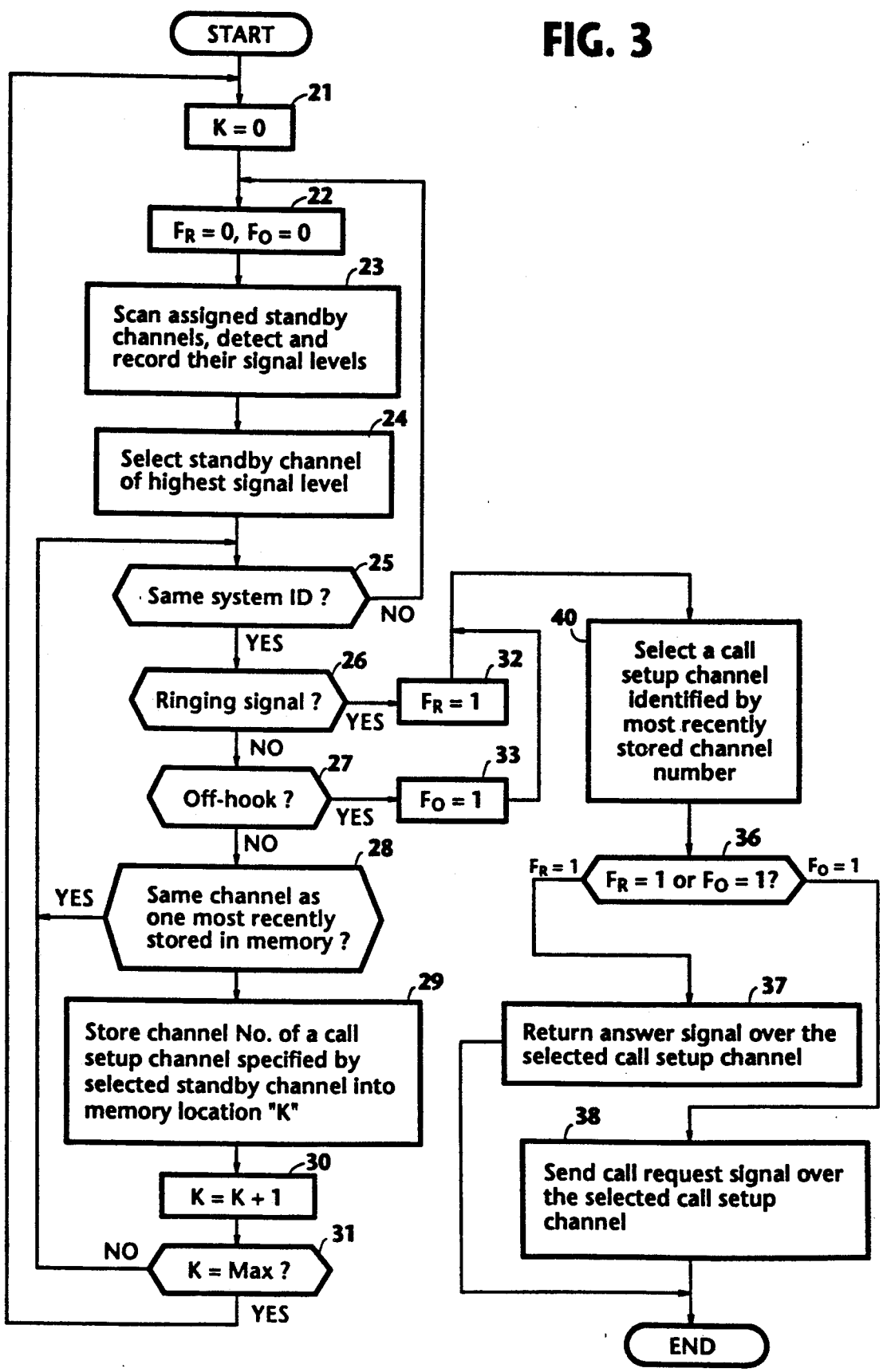
FIG. 3 is a flowchart illustrating a modified embodiment of FIG. 2.

A modified embodiment of this invention is shown in FIG. 3 which differs from the FIG. 2 embodiment in that operations steps 34 and 35 of FIG. 2 are replaced with operations step 40. Following the execution of step 32 or 33, control exits to step 40 to select the call setup channel whose channel number is most recently stored into memory location K. Frequency synthesizers 4 and 14 are controlled so that the mobile station is tuned to the selected call setup channel.

Figure 4A:
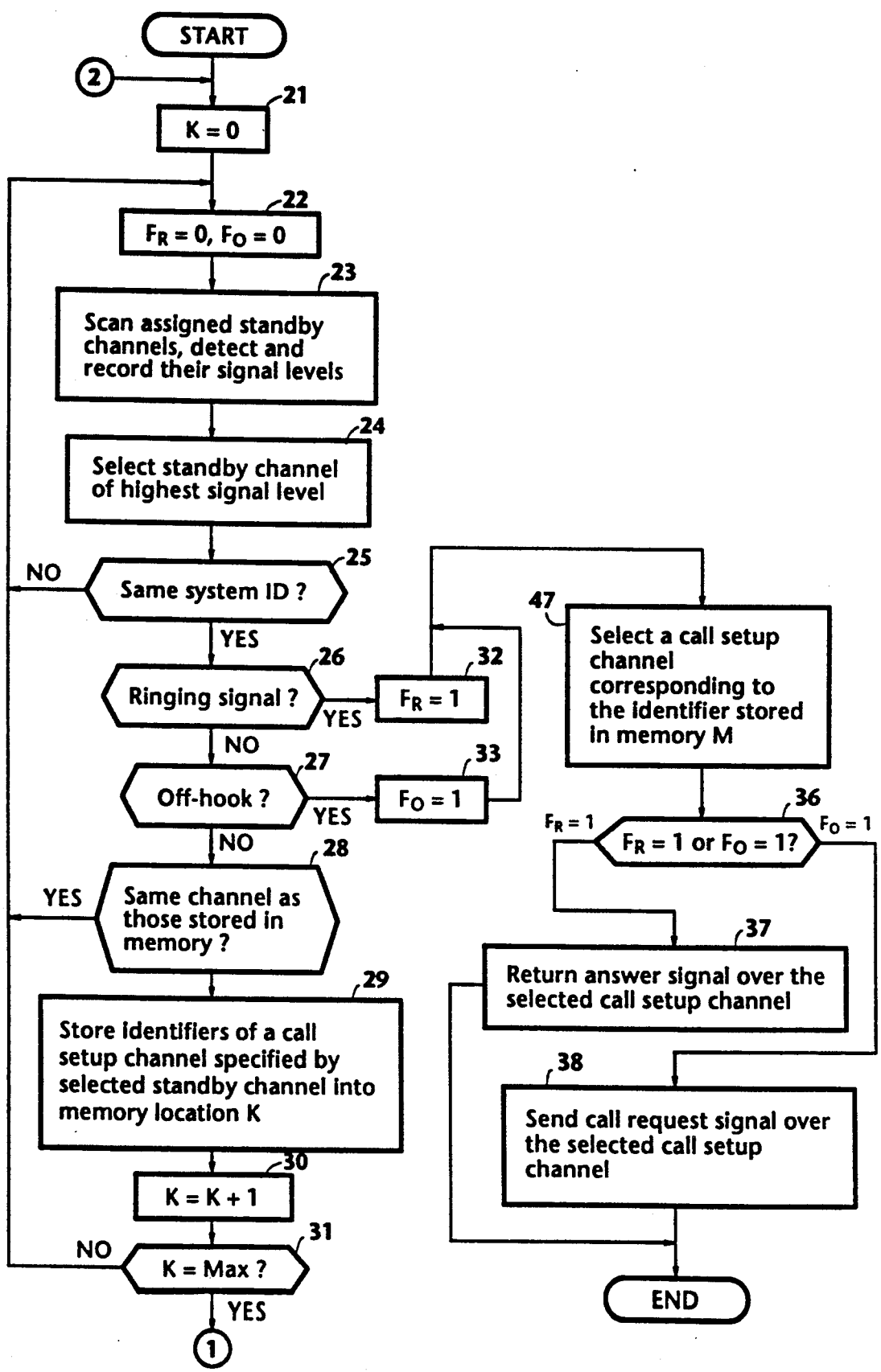

FIGS. 4A and 4B are flowcharts of a further modification of the present invention. In FIG. 4A, following the negative decision of step 31, control goes to operations step 41 (FIG. 4B) to transfer all identifiers stored in memory locations K to memory locations L. Step 42 is followed by decision step 42 which checks to see if the contents of memory locations L are sufficient to make a statistical analysis. If the answer is affirmative, exit is to operations step 43 in which the channel number stored in locations L are sorted according to different channels. Exit then is to operations step 44 in which same channel numbers are counted. Control moves to step 45 to detect a maximum count value and store the channel number of the maximum count into a memory location M (step 46).

In FIG. 4A, operations steps 34 and 35 of FIG. 2 are replaced with step 47 in which the call setup channel of the identifier stored in memory location M is selected, and the frequency synthesizers 4 and 14 are controlled to tune the mobile station to the selected call setup channel.

The foregoing description shows only preferred embodiments of the present invention. Various modifications are apparent to those skilled in the art without departing from the scope of the present invention which is only limited by the appended claims. For example, if memory 15 is implemented with a first-in-first-out (FIFO), steps 21, 30 and 31 could be dispensed with. Furthermore, two-way channels could also be used for standby channels as well as for call-setup channels.

What is claimed is:

1. A method for selecting channels in a mobile station for a cellular mobile telephone system serving a plurality of cells, each of the cells being assigned a unique standby channel, and said mobile station is assigned a plurality of standby channels and a system identifier identifying said system, the method comprising:
   a) scanning said standby channels to detect signal levels and selecting one of the scanned standby channels having a highest signal level;
   b) detecting whether there is a match between a system identifier contained in the selected standby channel and the system identifier of said mobile station;
   c) if said match is detected, detecting whether there is an originating call from or an incoming call to the mobile station;
   d) if there is no originating or incoming call detected by the step (c), storing a channel number of a call setup channel specified by the selected standby channel into a successive location of a memory;
   e) repeating the steps (a) to (d); and
   f) if there is an originating or incoming call detected by the step (c), selecting one of the call setup channels stored in said memory.

2. A method as claimed in claim 1, wherein the call setup channel selected in step (f) has a highest signal level.

3. A method as claimed in claim 1, wherein the channel number of the call setup channel selected by the step (f) is a most recently stored channel number among the channel numbers stored in said memory.

4. A method as claimed in claim 1, wherein the channel number of the call setup channel selected by the step (f) is a most frequently stored channel number of those stored in said memory.

5. A mobile station for a cellular mobile telephone system serving a plurality of cells, each of the cells being assigned a unique standby channel, and said mobile station is assigned a plurality of standby channels and a system identifier identifying said system, the mobile station comprising:
   a tunable radio-frequency transceiver; and
   a channel controller coupled to said transceiver for:
   a) causing said transceiver to tune to one of the standby channels having a highest signal level;
   b) detecting a match between a system identifier contained in the selected standby channel and the system identifier of said mobile station;
   c) detecting whether there is an originating call from or an incoming call to the mobile station;
   d) storing a channel number of a call setup channel specified by the selected standby channel into a different location of a memory in response to the absence of said originating or incoming call;
   e) repeating steps (a)–(d);
   f) selecting one of the stored channel numbers in response to the presence of said originating or incoming call; and
   g) causing said transceiver to tune to one of the call setup channels having said selected channel number.

6. A mobile station as claimed in claim 5, wherein the tuned call setup channel has a highest signal level among the call setup channels whose channel numbers are stored in said memory.

7. A mobile station as claimed in claim 5, wherein the channel number of the tuned call setup channel is a most recently stored channel number among the channel numbers stored in said memory.

8. A mobile station as claimed in claim 5, wherein the channel number of the tuned call setup channel is a most frequently stored channel number of those stored in said memory.

* * * * *